(12) United States Patent
LEE et al.

(10) Patent No.: US 7,944,908 B2
(45) Date of Patent: May 17, 2011

(54) METHOD FOR SETTING OUTPUT BIT RATE FOR VIDEO DATA TRANSMISSION IN A WIBRO SYSTEM

(75) Inventors: Chang-Hyun LEE, Seoul (KR); Tae-Sung Park, Yongin-si (KR); Jae-Hoon Kwon, Seongnam-si (KR); Do-Young Joung, Seoul (KR); Jae-Sung Park, Gunpo-si (KR); Sung-Kee Kim, Suwon-si (KR); Yong-Gyoo Kim, Seoul (KR); Yun-Je Oh, Yongin-si (KR); Si-Hai Wang, Suwon-si (KR)

(73) Assignee: Samsung Electronics Co., Ltd., Yeongtong-Gu, Suwon-Si,Gyeonggi-Do (KR)

( * ) Notice: Subject to any disclaimer, the term of this patent is extended or adjusted under 35 U.S.C. 154(b) by 136 days.

(21) Appl. No.: 12/249,012

(22) Filed: Oct. 10, 2008

(65) Prior Publication Data

US 2009/0097405 A1 Apr. 16, 2009

(30) Foreign Application Priority Data

Oct. 10, 2007 (KR) ........................ 10-2007-0102000

(51) Int. Cl.
*H04L 12/28* (2006.01)
(52) U.S. Cl. ....................................................... 370/351
(58) Field of Classification Search .................. None
See application file for complete search history.

(56) References Cited

U.S. PATENT DOCUMENTS

| | | | | |
|---|---|---|---|---|
| 5,208,810 A * | 5/1993 | Park | ............................. | 370/230 |
| 6,728,233 B1 * | 4/2004 | Park et al. | .................... | 370/342 |
| 7,215,930 B2 * | 5/2007 | Malladi | ...................... | 455/67.11 |
| 2006/0126586 A1 * | 6/2006 | Um et al. | ...................... | 370/338 |
| 2007/0171840 A1 * | 7/2007 | Kim et al. | ..................... | 370/252 |
| 2007/0280181 A1 * | 12/2007 | Matsuo et al. | ................ | 370/338 |
| 2008/0123544 A1 * | 5/2008 | Tujkovic et al. | .............. | 370/252 |
| 2008/0176593 A1 * | 7/2008 | Bachl et al. | .................... | 455/522 |
| 2009/0131101 A1 * | 5/2009 | Van Rooyen | ............. | 455/552.1 |

FOREIGN PATENT DOCUMENTS

| | | |
|---|---|---|
| KR | 2002-38180 | 5/2002 |
| KR | 2005-45667 | 5/2005 |
| KR | 2005-63535 | 6/2005 |

* cited by examiner

*Primary Examiner* — Chi H Pham
*Assistant Examiner* — Fan Ng
(74) *Attorney, Agent, or Firm* — Cha & Reiter, LLC

(57) ABSTRACT

A method for setting an output bit rate for video data transmission in a WiBro system in which an uplink state value for a predetermined unit time is calculated to determine an uplink network state of the predetermined unit time. An average of uplink state values for a predetermined number of unit times is calculated, and a video encoding bit rate is increased if the average of the uplink state values is larger than a predetermined first threshold. However, the video encoding bit rate is decreased if the average of the uplink state values is less than a predetermined second threshold.

8 Claims, 5 Drawing Sheets

METHOD FOR SETTING OUTPUT BIT RATE FOR VIDEO DATA TRANSMISSION IN A WIBRO SYSTEM

CLAIM OF PRIORITY

This application claims the benefit of priority under 35 U.S.C. §119(a) of a Korean Patent Application filed in the Korean Intellectual Property Office on Oct. 10, 2007 and assigned Serial No. 2007-102000, the entire disclosure of which is hereby incorporated by reference in its entirety.

BACKGROUND OF THE INVENTION

1. Field of the Invention

The present invention generally relates to a Wireless Broadband (WiBro) system. More particularly, the present invention relates to a method for a method for determining the congestion state of the wireless network that causes a time delay and a stable algorithm for improving the quality of real-time video data transmission of video data in a WiBro system.

2. Description of the Related Art

Due to a wide bandwidth and a strict transmission delay constraint, there have been long-standing difficulties associated with efforts to commercialize video streaming service over a wireless network. Now that the recent increases in wireless access speed and the recent development of video compression technology have made the video stream service possible over the wireless network.

In particular, Korean Mobile Worldwide Interoperability for Microwave Access (WIMAX) or WiBro (IEEE 802.16e) has attracted a great deal of interest from mobile communication service providers as a future-generation wireless communication network due to a bandwidth of tens of Mbps and a mobility of tens of km/h. Yet, there are still difficulties in seamlessly reproducing video data between end-to-end entities. Radio channels change so much over the wireless network that the Bit Error Rate (BER) often changes a number of times per second. Also, the guarantee of high mobility likely results in frequent handovers, and delays occurs with increasingly frequency due to increasing network congestion.

Although errors generated at a PHYsical (PHY) layer end can be addressed by the use of an additional bandwidth, this problem may also be addressed by Forward Error Correction (FEC) and Automatic Repeat reQuest (ARQ) in terms of channel coding. In WiBro, Hybrid ARQ (HARQ) is adopted in view of end-to-end delay. To solve the shortcomings of WiBro that implements hard handover, studies are under way on improving the performance of a PHY Modulator-Demodulator (MODEM) and on many fast handover algorithms.

Typically, the quality of real-time video transmission is affected more by delay than by error-caused temporal loss, and handover over the wireless network. A delay constraint is related to a rate constraint in the real-time video transmission. If network congestion increases the time delay, a transmitter can experience buffer overflow, and a receiver may undergo buffer underflow. Consequently, seamless video transmission to the receiver is impeded and results in lost data. Therefore, when the state of the wireless network gets so poor as to impede seamless video transmission due to a time delay, it is necessary to reduce the video, output rate of the transmitter. If the state of the wireless network improves, the video output rate of the transmitter needs to be increased.

The above operation typically is governed by a parameter by which to evaluate the state of the wireless network, conventionally information about the PHY layer of the wireless network. For example, the main PHY layer parameters used in a WiBro network are Channel Quality Indicator (CQI), Adaptive Modulation and Coding (AMC) level, etc. The PHY layer parameters are feasible if an available bandwidth is sufficient. However, when the network is congested, the correlation between the transmitter and the receiver decreases considerably, thereby rendering the use of PHY layer parameters as being infeasible.

Accordingly, there exists a need in the art for a method of determining the congestion state of the wireless network that causes a time delay and a stable algorithm for improving the quality of real-time video data transmission.

SUMMARY OF THE INVENTION

The present invention provides a method for determining the congestion state of a network that causes a time delay and setting an output bit rate based on the determined congestion state in order to improve real-time video transmission quality in a WiBro network.

In accordance with an exemplary aspect of the present invention, there is provided a method for setting an output bit rate for video data transmission in a WiBro system, in which an uplink state value for a predetermined unit time is calculated to determine an uplink network state of the predetermined unit time, an average of uplink state values for a predetermined number of unit times is calculated, and a video encoding bit rate is increased, if the average of the uplink state values is larger than a predetermined first threshold and decreased, if the average of the uplink state values is less than a predetermined second threshold.

BRIEF DESCRIPTION OF THE DRAWINGS

The above and other exemplary objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION

Figure 1:
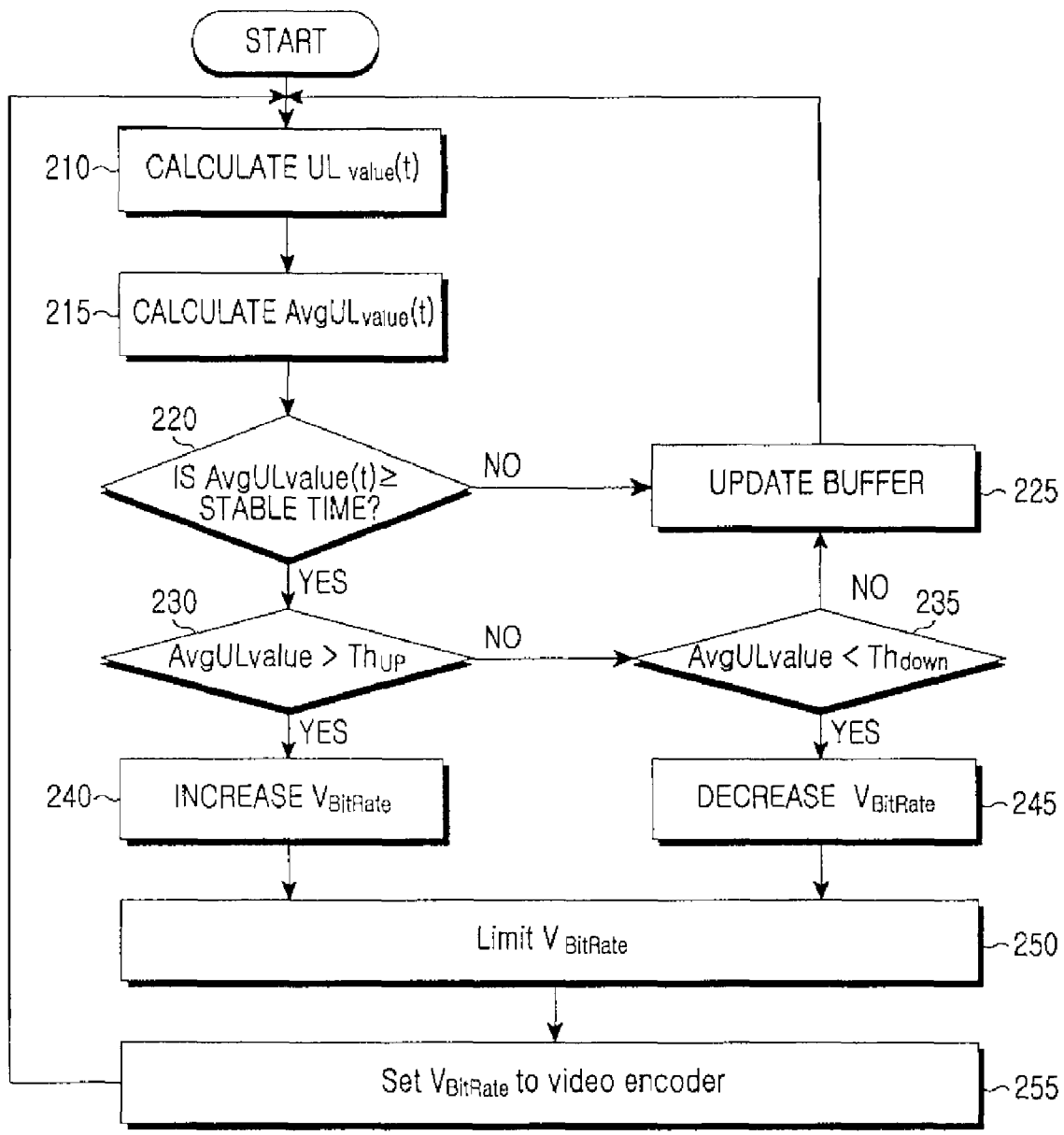
FIG. 1 is a flowchart illustrating an operation for setting an output bit rate for video data transmission in a WiBro system according to an exemplary embodiment of the present invention.

The following description is provided for illustrative purposes to assist a person of ordinary skill in the art with a comprehensive understanding of the invention. Accordingly, those of ordinary skill in the art will recognize that various changes and modifications of the exemplary embodiments described herein can be made without departing from the spirit of the invention and the scope of the appended claims.

Also, descriptions of well-known functions and constructions may be omitted for clarity and conciseness when their inclusion would obscure appreciation of the subject matter of the present invention by a person or ordinary skill in the art.

A network congestion-caused delay affects video quality during real-time video data transmission. To appropriately cope with the delay, it is necessary to determine the state of a network. Conventionally, the network state is determined based on PHY layer information, with the problems as described herein above.

Therefore, the present invention uses Media Access Control (MAC) layer information to determine a congestion state of the network as well as its physical state.

A WiBro MODEM can support a data rate granted by a Base Station (BS). An uplink data rate is decided by MAC scheduling of the BS. For the MAC scheduling, the BS uses MAC level information according to a Channel Quality Information (CQI) of the PHY layer. Since the MAC scheduling is not specified in the adopted standards, MAC scheduling remains as an implementation issue. Some studies have been conducted on the MAC scheduling as follows.

Existence of a queue for each service

Fair queuing of services with the same Quality of Service (QoS) level

Waited queuing of services with different QoS levels

That is, WiBro performs MAC scheduling by fair queuing such as Weighted Fair Queuing (WFQ) to support services with different QoS requirements. As the number of services to be dealt with increases, or a service traffic is large, the fair queuing increases the time required for data transmission. It can be said that a video encoder output bit rate subject to bit rate control is fixed. Hence, if a granted uplink data rate is lower than a set bit rate, a Mobile Station (MS) can determine that the network is congested. The network state is determined based on the uplink data rate alone that is analyzed in the above-described manner and accordingly, an appropriate video encoding bit rate is set in the present invention.

Video quality is better as a given bit rate is higher for encoding. However, Packet Loss Ratio (PLR) increases with the Bit Error Rate (BER), thereby degrading video quality under a network congestion. Hence, a bit rate should be appropriately controlled according to the network state to achieve a higher video quality. In accordance with the present invention, a video size is set to QVGA (320×240), taking into account a terminal size and a bit rate setting range is divided into four bit rate levels, 64, 128, 192 and 256 kbps. This bit rate setting range may vary with a target video size and the access rate of a service network.

FIG. 1 is a flowchart illustrating an operation for setting an output bit rate for video data transmission in a WiBro system according to an exemplary embodiment of the present invention. With reference to FIG. 1, the operation for setting an output bit rate for video data transmission will now be described.

Referring to FIG. 1, an uplink state value $UL_{value}$ is calculated in step 210. $UL_{value}$ represents an uplink network state for a unit time that is set to determine the state of the network according to an exemplary embodiment of the present invention. Basically, $UL_{value}$ is computed using an uplink data rate. A WiBro uplink data rate is higher than a video bit rate set for encoding because of packetization and a Hybrid Automatic Repeat reQuest (HARQ).

Figure 2:
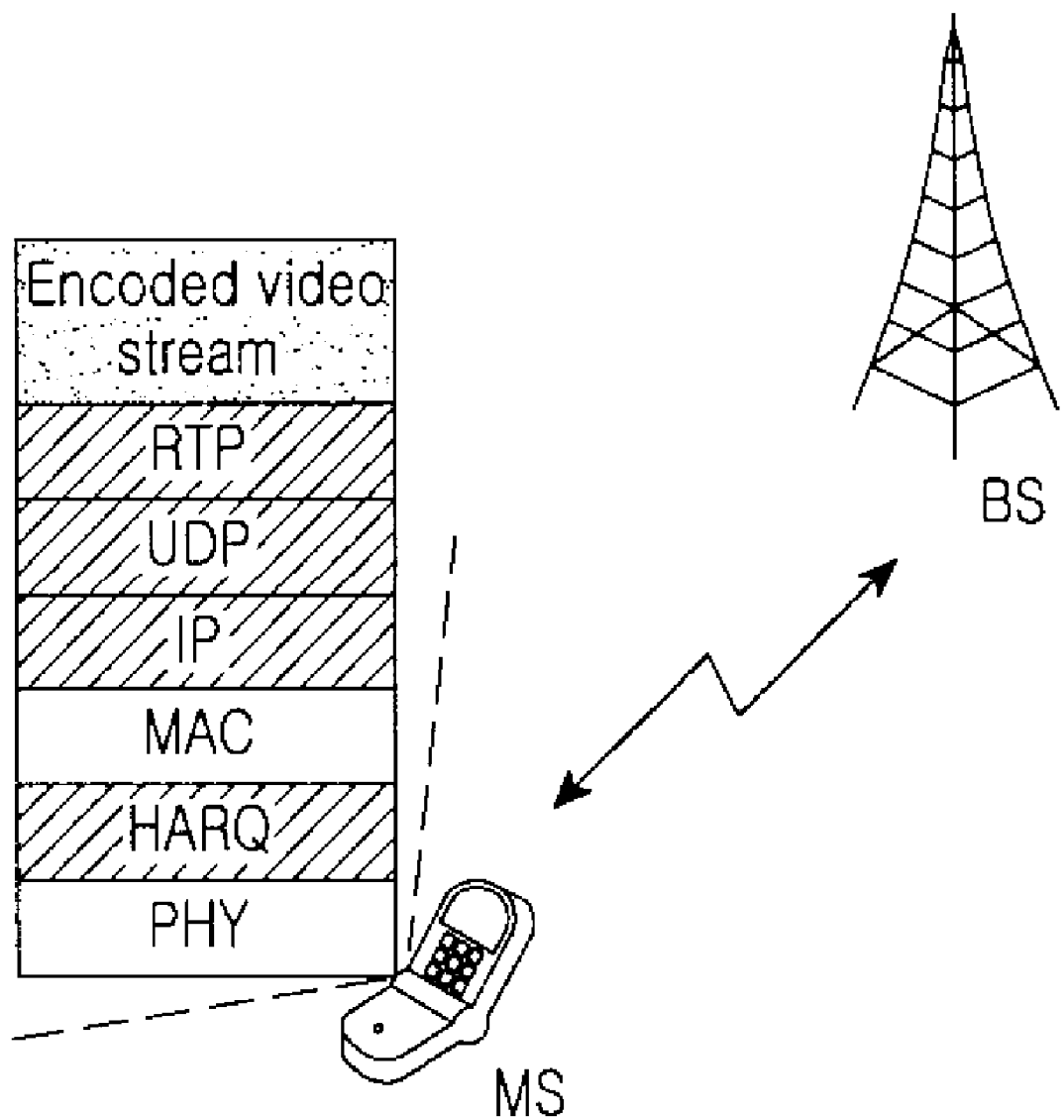
FIG. 2 illustrates the protocol stack of a video stream that is transmitted in the output bit rate setting method in the WiBro system according to an exemplary embodiment of the present invention.

FIG. 2 illustrates the protocol stack of a video stream that is transmitted in the output bit rate setting method in the WiBro system according to an exemplary embodiment of the present invention. Referring to FIG. 2, the video stream is packetized in a Real-Time Transport Protocol (RTP) layer, a User Datagram Protocol (UDP) layer, an Internet protocol (IP) layer, a MAC layer, an HARQ layer, and a PHY layer. In IP version 4 (IPv4), 40 bytes are added to the video stream, whereas in IP version 6 (IPv6), 60 bytes are added to the video stream in the RTP/UDP/IP layer. When HARQ is employed, the length of a video stream to be retransmitted is increased redundantly according to the state of a radio channel.

As illustrated in FIG. 1, because certain thresholds $Th_{up}$ and $Th_{down}$ are predetermined for rendering a decision as to whether to finally increase or decrease a video encoding bit rate, an uplink data rate should be normalized, taking into account additional extra bytes. As the uplink data rate is proportional to a bit rate set during video encoding, it is divided by the set bit rate. Thus, $UL_{value}$ is given by $$UL_{value}(t) = \frac{UL_{bits}(t) \cdot \alpha}{T_s \cdot V_{BitRate} \cdot R_{norm}} \quad (1)$$

where $UL_{value}(t)$ denotes an uplink state value at unit time t, $UL_{bits}(t)$ denotes the number of transmitted data bits at unit time t, $\alpha$ denotes a value that leads to a higher bit rate, $T_s$ denotes the duration of the unit time, $V_{BitRate}$ denotes the set video encoding bit rate, and $R_{norm}$ denotes a normalized value of extra bytes added to the video stream.

Referring now to FIG. 1 again, the average of uplink state values for a predetermined time period, $AvgUL_{value}$ is calculated in step 215.

The uplink state value calculated at each unit time fluctuates significantly. This frequent change in the uplink state value does not reflect the network state. Rather, it results from changes incurred by MAC scheduling and HARQ. Therefore, to avert this problem, the average of uplink state values for a predetermined time period, $AvgUL_{value}$ is calculated in the present invention. As the time period for which the average uplink state value is computed increases, the variation of the uplink state value decreases but immediate responsiveness to the network state is reduced. Accordingly, a buffer of an appropriate size is required. For example, the buffer size can be set to accommodate the latest 10 uplink state values $UL_{value}$ to be averaged. $AvgUL_{value}$ is expressed as $$AvgUL_{value} = \frac{\sum_{i=0}^{N_{avg}-1} UL_{value}(i \cdot T_s)}{N_{avg}} \quad (2)$$

where $AvgUL_{value}$ denotes the average of uplink state values and $N_{avg}$ denotes the number of valid uplink state values buffered in the buffer, which are to be averaged. $N_{avg}$ is given as $$N_{avg} = \min\{N_B, N_{VL}\} \quad (3)$$

where $N_{avg}$ denotes the number of valid uplink state values to be averaged in the buffer, $N_B$ denotes the buffer size, and $N_{VL}$ denotes the number of uplink state values that were calculated under the same video bit rate.

$AvgUL_{value}$ represents a network state. If the network state is good without congestion, $AvgUL_{value}$ is close to 1. If the network state is poor, $AvgUL_{value}$ is less than 1.

Still referring to FIG. 1, in step 220, the total time for which the average of uplink state values has been computed is compared with a predetermined stable time. As the buffer buffers fewer uplink state values $UL_{value}$, $AvgUL_{value}$ changes more and thus it cannot be reliable as a parameter for setting a new bit rate. Hence, the new bit rate setting should be reserved for a certain time period in which $AvgUL_{value}$ gets stable. To determine the network state accurately, the time period is preset as the stable time.

However, if the total time for which $AvgUL_{value}$ was computed is too short to acquire a stable $AvgUL_{value}$ in step 220, the buffer is updated to further buffer uplink state values $UL_{value}$ for a sufficient time in step 225 and returns to step 210.

If the total time for which $AvgUL_{value}$ was computed reaches the predetermined stable time in step 220, $AvgUL_{value}$ is compared with the first threshold $Th_{up}$ in step 230. If $AvgUL_{value}$ is larger than $Th_{up}$, it is determined that the network is in a good state. Hence, the video bit rate $V_{BitRate}$ is increased in step 240 and the highest value of $V_{BitRate}$ is limited in step 250. On the other hand, if $AvgUL_{value}$ is equal to or less than $Th_{up}$, $AvgUL_{value}$ is compared with the second threshold $Th_{down}$ in step 235. If $AvgUL_{value}$ is equal to or larger than $Th_{down}$, the procedure returns to step 225. Hence, the video bit rate is kept unchanged and the buffer is updated to secure room for further buffering new uplink state values $UL_{value}$.

If $AvgUL_{value}$ is less than $Th_{down}$ in step 235, it is determined that the network is in poor state. Hence, the video bit rate $V_{BitRate}$ is decreased in step 245 and the lowest value of $V_{BitRate}$ is limited in step 250.

The thresholds $Th_{up}$ and $Th_{down}$ are determined by $N_{avg}$, given as $$Th_{up} = 1 + \frac{1}{N_{avg}} \quad (4)$$

$$Th_{down} = 1 - \frac{1}{N_{avg}} \quad (5)$$

The bit rate setting of steps 240 and 245 is carried out by $$V_{BitRate} = \begin{bmatrix} \min\{256k, (\frac{V_{BitRate}}{64k} + 1) \cdot 64k\}; AvgUL_{value} > Th_{up} \\ \max\{64k(\frac{V_{BitRate}}{64k} - 1) \cdot 64k\}; AvgUL_{value} < Th_{down} \end{bmatrix} \quad (6)$$

where k in 256 k and 64 k denotes 1000 times.

Limiting the bit rate in step 25 after the bit rate adjustment in steps 240 and 245 amounts to setting the limits of the bit rate using min{ } and max { } when the bit rate is increased or decreased in equation (6). Therefore, when the bit rate is to be increased, the highest bit rate is limited to 256 k in step 250 and, when the bit rate is to be decreased, the lowest bit rate is limited to 64 k in step 250.

Still referring to FIG. 1 when the video bit rate $V_{BitRate}$ is changed in step 240 or 245, the buffered uplink state values $UL_{value}$ are all cleared from the buffer, for buffering new uplink state values, because the changed $V_{BitRate}$ changes uplink state values considerably as noted from equation (1).

In step 255, a video encoder is set to the video bit rate $V_{BitRate}$ set in the above procedure.

In addition, if the video bit rate is set in the above manner, $AvgUL_{value}$ is kept around 1 in a good network state, thus making it difficult to increase the bit rate. For example, if an initial video bit rate is set to 128 kbps, it needs to be increased to between about 192 kbps and 256 kbps to improve video quality when the network state gets better, but the bit rate increase is difficult. To solve this problem, α is adjusted so that a bit rate increase is available. As a consequence, when the network state becomes better, the bit rate can be increased up to the highest and when the network state becomes poorer, the bit rate can be decreased down to the lowest according to equation (6).

Tests of Video Transmission Quality Using Network Simulator

The performance of the present invention can be verified by simulating the exemplary embodiments of the present invention via a network simulator. To test the real-time video transmission quality of the present invention with and without network congestion, 'QualNet version 3.9.5' is typically used as the network simulator, and WiBro networks are virtually configured with and without network congestion. Simulation parameters used in the simulation are given as follows.

TABLE 1

| Parameter | Value |
| --- | --- |
| $T_s$ | 0.5 sec |
| $R_{norm}$ | 1.27 |
| α | 1.15 |
| $N_B$ | 10 |
| Stable time | 5 sec |
| $Th_{up}$ | 1.1 |
| $Th_{down}$ | 0.9 |
| Initial $V_{BitRate}$ | 192 kbps |

In Table 1, Stable time denotes the time required for $AvgUL_{value}$ to be stable after the video bit rate is changed. Considering T, is 0.5 second, a stable time of 5 seconds is equivalent to a buffer size of 10 ($N_B$). Thus, equation (4) is always calculated when the buffer is filled to the size of $N_B$. $N_{avg} = N_B$ by equation (3) and $Th_{up} = 1.1$ and $Th_{down} = 0.9$ by equation (4) and equation (5).

A description will be made below of how much the proposed algorithm improves video transmission quality with respect to fixed video bit rates based on the above parameters in the following three WiBro network scenarios. In all scenarios, the MSs receive BE QoS services. Since MAC scheduling is fair among services with the same QoS, the simulation was performed in the context of BE services with the lowest QoS.

(1) WiBro Scenario 1: Low Congestion and No Mobility

Figure 3:
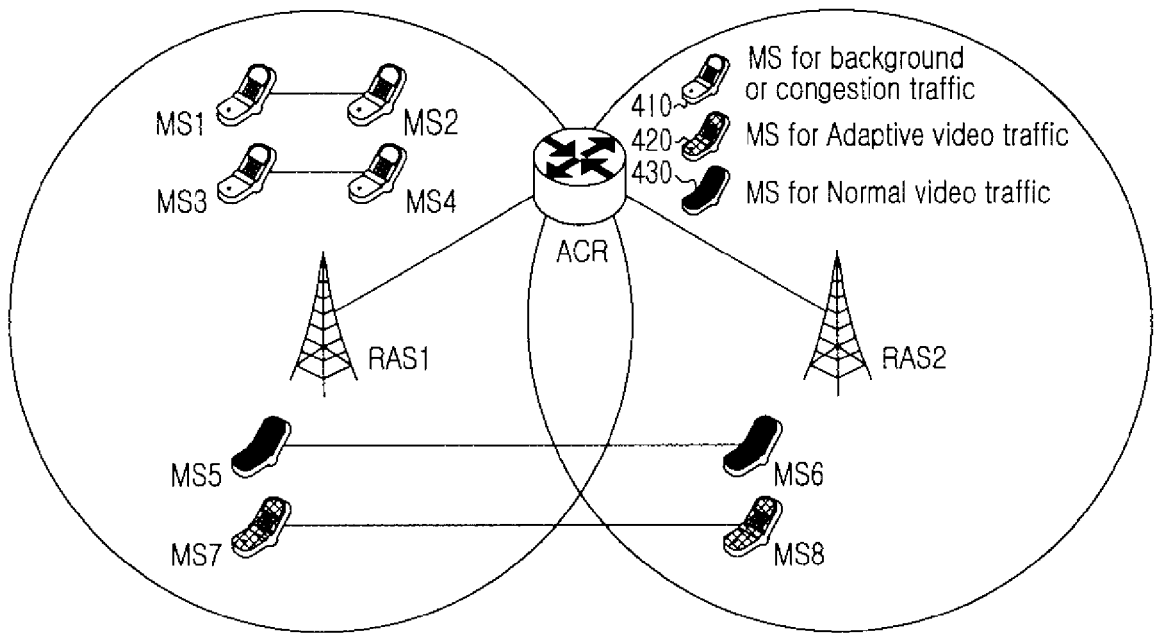
FIG. 3 illustrates a first simulation scenario for testing video transmission quality according to the present invention.

FIG. 3 illustrates a first simulation scenario for testing video transmission quality according to the present invention. The simulation environment of the first scenario is illustrated in FIG. 3, wherein a system bandwidth is about 8.75 Mhz, a Time Division Duplex (TDD) frame length is about 5 ms, a Fast Fourier Transform (FFT) size is about 1024 points, Transmission/Reception Transition Gaps (TTGs) are about 87.2 μs and 74.4 μs, a ratio of Cyclic Prefix (CP) is about ⅛, and a DownLink (DL):UpLink (UL) ratio is about 27:15. Eight MSs exist in total. Background traffic and simulation conditions are given in Table 2 and the results of the simulation are illustrated in Table 3.

TABLE 2

| Simulation condition | Value |
| --- | --- |
| Simulation time | 100 sec |
| MS1-MS2 | Bi-directional CBR 500 kbps for 10 to |
| MS3-MS4 | 100 sec in each case |
| MS3-MS4 | Bi-directional CBR 500 kbps for 20 to |
|  | 60 sec and for 80 to 100 sec |

TABLE 2-continued

| Simulation condition | Value |
|---|---|
| MS5-MS6 | Real-time video streams at fixed 256 kbps for 10 to 100 sec |
| MS7-MS8 | Real-time video streams for 10 to 100 sec when the proposed algorithm is used and when four fixed video bit rates are applied |

TABLE 3

| MS7-MS8 | PSNR (dB) average | PSNR (dB) improvement | PLR average | PLR improvement |
|---|---|---|---|---|
| Proposed algorithm | 30.721 | — | 0.0105 | — |
| Fixed video bit rates 64 kbps | 24.589 | 6.1 | 0.0098 | −0.1% |
| 128 kbps | 27.830 | 2.9 | 0.0099 | −0.1% |
| 192 kbps | 29.917 | 0.8 | 0.0084 | −0.2% |
| 256 kbps | 30.796 | −0.1 | 0.0088 | −0.2% |

Because WiBro Scenario 1 is characterized by low congestion, Peak Signal-to-Noise Ratio (PSNR) being a video quality measure increases with bit rate in the case of fixed video bit rates, as noted from Table 3. Relative to the fixed video bit rates, the proposed algorithm produces improved results in almost all cases. Because Initial $V_{BitRate}$ is 192 kbps, the proposed algorithm results in a lower PSNR than a fixed video bit rate of 256 kbps. The proposed algorithm has PLRs below 1%, similar to those at the fixed video bit rates.

(2) WiBro Scenario 2: Low Congestion and Mobility.

Figure 4:
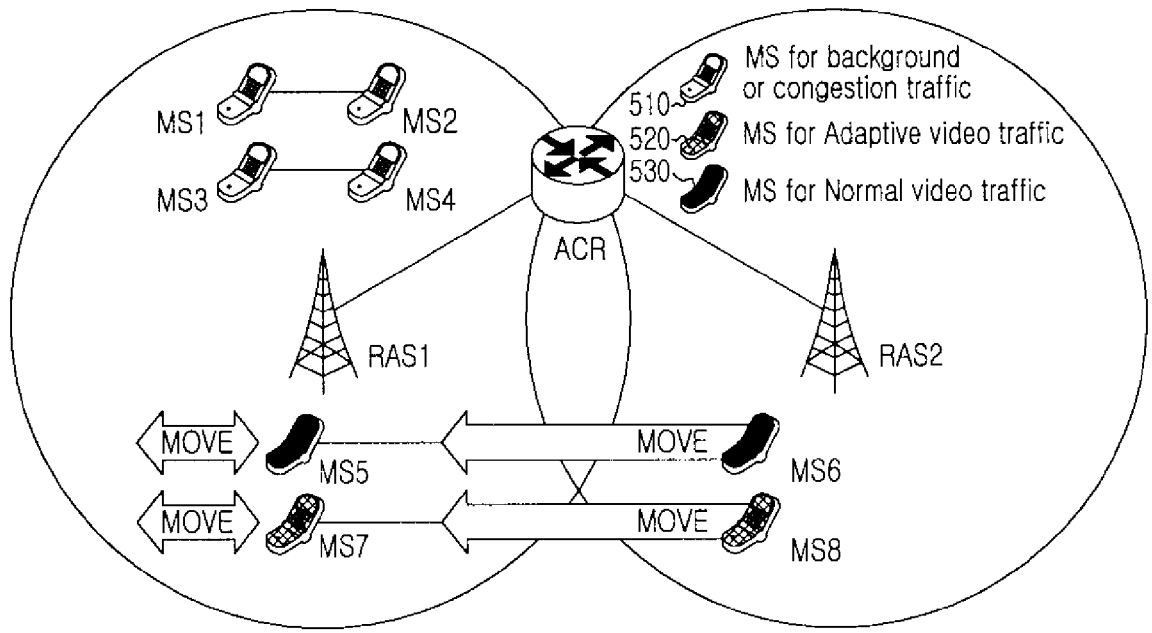
FIG. 4 illustrates a second simulation scenario for testing video transmission quality according to the present invention.

FIG. 4 illustrates a second simulation scenario for testing video transmission quality according to the present invention. The simulation environment of the second scenario is illustrated in FIG. 4.

Referring to FIG. 4, a system bandwidth is about 8.75 Mhz, a TDD frame length is about 5 ms, an FFT size is about 1024 points, TTGs are about 87.2 μs and 74.4 μs, a ratio of CP is about ⅛, and a DL:UL ratio is about 27:15. Eight MSs exist in total. Background traffic and simulation conditions are given in Table 4 and the simulation results are illustrated in Table 5.

TABLE 4

| Simulation condition | Value |
|---|---|
| Simulation time | 200 sec |
| MS1-MS2 MS3-MS4 | Bi-directional CBR 500 kbps for 10 to 200 sec in each case |
| MS3-MS4 | Bi-directional CBR 500 kbps for 20 to 60 sec and for 80 to 120 sec |
| MS5-MS6 | Real-time video streams at fixed 256 kbps for 10 to 200 sec |
| MS7-MS8 | Real-time video streams for 10 to 200 sec when the proposed algorithm is used and when four fixed video bit rates are applied |
| MS5, MS7 | Move at 40 km/h, no handover |
| MS6, MS8 | Move at 40 km/h, handover occurs |

TABLE 5

| MS7-MS8 | PSNR (dB) average | PSNR (dB) improvement | PLR average | PLR improvement |
|---|---|---|---|---|
| Proposed algorithm | 30.114 | — | 0.0104 | — |
| Fixed video bit rates 64 kbps | 24.601 | 5.5 | 0.0120 | 0.2% |
| 128 kbps | 27.917 | 2.2 | 0.0097 | −0.1% |
| 192 kbps | 29.475 | 0.6 | 0.0127 | 0.2% |
| 256 kbps | 30.326 | −0.2 | 0.0176 | 0.7% |

Because WiBro Scenario 2 is characterized by low congestion, PSNR increases with bit rate in the case of fixed video bit rates, as noted from Table 5. Relative to the fixed video bit rates, the proposed algorithm produces improved results in almost all cases. Because Initial $V_{BitRate}$ is 192 kbps, the proposed algorithm results in a lower PSNR than a fixed video bit rate of 256 kbps. The proposed algorithm has PLRs below 1%, similar to those at the fixed video bit rates.

(3) WiBro Scenario 3: High Congestion and Mobility.

Figure 5:
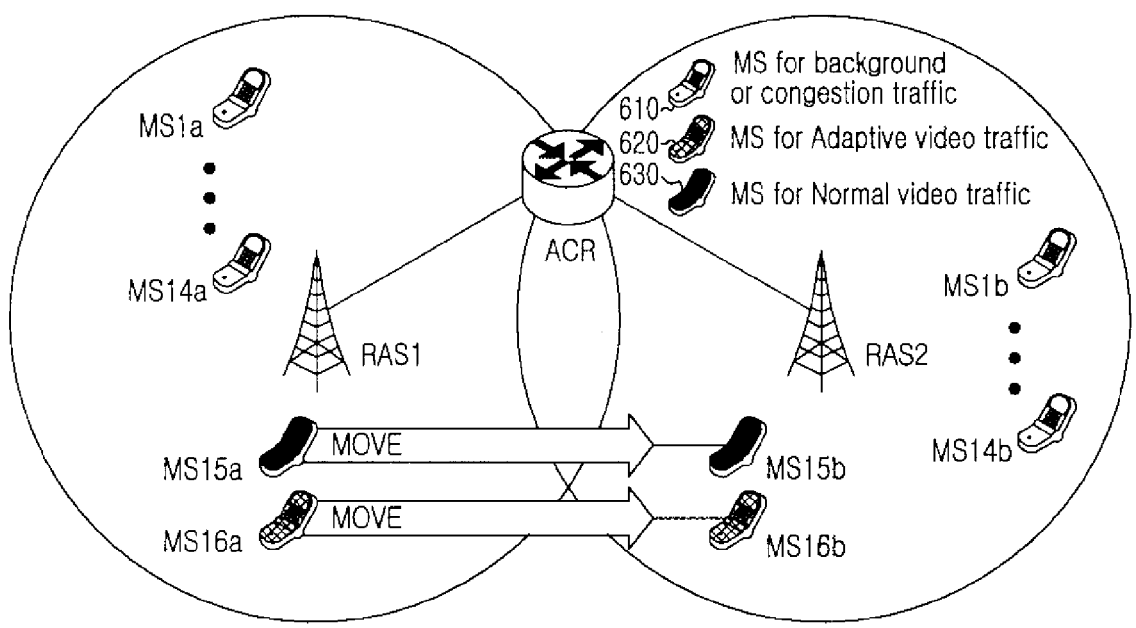
FIG. 5 illustrates a third simulation scenario for testing video transmission quality according to the present invention.

FIG. 5 illustrates a third simulation scenario for testing video transmission quality according to the present invention. The simulation environment of the third scenario is illustrated in FIG. 5.

Referring now to FIG. 5, a system bandwidth is about 8.75 Mhz, a TDD frame length is about 5 ms, an FFT size is about 1024 points, TTGs are about 87.2 μs and 74.4 μs, a ratio of CP is about ⅛, and a DL:UL ratio is about 27:15. In addition, 32 MSs exist in total. Background traffic and simulation conditions are given in Table 6 and the results of the simulation are illustrated in Table 7.

TABLE 6

| Simulation condition | Value |
|---|---|
| Simulation time | 200 sec |
| MS1a→MS1b, ..., MS13a→MS13b | CBR 130 kbps for 10 to 200 sec in each case |
| MS1a←MS1b, ..., MS13a←MS13b | CBR 130 kbps for 10 to 200 sec in each case |
| MS14a-MS14b | Bi-directional CBR 500 kbps for 20 to 70 sec and for 130 to 170 sec |
| MS15a-MS15b | Real-time video streams at fixed 256 kbps for 10 to 200 sec |
| MS16a-MS16b | Real-time video streams for 10 to 200 sec when the proposed algorithm is used and when four fixed video bit rates are applied |
| MS15a, MS16a | Move at 60 km/h, handover occurs |

TABLE 7

| MS16a-MS16b | PSNR (dB) average | PSNR (dB) improvement | PLR average | PLR improvement |
|---|---|---|---|---|
| Proposed algorithm | 27.768 | — | 0.0645 | — |
| Fixed video bit rates 64 kbps | 24.542 | 3.2 | 0.0140 | −5.1% |
| 128 kbps | 27.119 | 0.6 | 0.0327 | −3.2% |
| 192 kbps | 25.656 | 2.1 | 0.1660 | 10.2% |
| 256 kbps | 22.400 | 5.4 | 0.2828 | 21.8% |

Because WiBro Scenario 3 is characterized by high congestion, PLR ranges from several percent to tens of percents (21.8% at 256 kbps), as noted from Table 7. In the case of fixed bit rates, the best video quality is achieved at 128 kbps in view of the trade-off relationship between video bit rate and PLR.

The proposed algorithm produces improved results in almost all cases, relative to the fixed video bit rates. This improvement occurs because the best video quality is achieved by reducing the video bit rate when the network state gets relatively poor and increasing it when the network state gets relatively good.

Thus it can be concluded that adaptive video bit rate setting by the proposed algorithm improves video quality in every case irrespective of congestion or no congestion, compared to the four fixed video bit rates.

In addition, the proposed algorithm of the present invention can be applied, for example, when an MS transmits real-time video streams such as for personal broadcasting, video call, etc. While the exemplary embodiments of the present invention consider the network state of a transmitter only because network-related information from a receiver is delivered slower as the network congestion becomes more severe, information from the receiver can also be considered additionally by applying the same criteria to the receiver, when needed or desired.

As is apparent from the above description of the present invention, when a WiBro MS transmits video data in real time in a WiBro system, MAC information is used to determine the congestion state of a wireless network as well as its physical state, and a video bit rate is adaptively decreased in a bad network state and increased in a good network state. Therefore, the best video quality is achieved.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for setting an output bit rate for video data transmission in a Wireless Broadband (WiBro) system, said method comprising:
   calculating an uplink state value for a predetermined unit time to determine an uplink network state of the predetermined unit time;
   calculating an average of uplink state values for a predetermined number of unit times; and
   increasing a video encoding bit rate if the average of the uplink state values is larger than a predetermined first threshold, and decreasing the video encoding bit rate, if the average of the uplink state values is less than a predetermined second threshold;
   maintaining the video encoding hit rate and clearing a buffer prior to receiving new uplink state values if the average of the uplink state values is less than the first threshold and larger than the second threshold; and
   wherein the video encoding bit rate is determined as any one of a plurality of video encoding bit rates, and the plurality of video encoding bit rates are provided for use in (1) low congestion and non-mobility, (2) low congestion and mobility, and (3) high congestion and mobility.

2. A method for setting an output bit rate for video data transmission in a Wireless Broadband (WiBro) system, said method comprising:
   calculating an uplink state value for a predetermined unit time to determine an uplink network state of the predetermined unit time;
   calculating an average of uplink state values for a predetermined number of unit times; and
   increasing a video encoding bit rate if the average of the uplink state values is larger than a predetermined first threshold, and decreasing the video encoding bit rate, if the average of the uplink state values is less than a predetermined second threshold,
   wherein the uplink state value calculation comprises calculating the uplink state value by the following equation, $$UL_{value}(t) = \frac{UL_{bits}(t) \cdot \alpha}{T_s \cdot V_{BitRate} \cdot R_{norm}}$$

where $UL_{value}(t)$ denotes an uplink state value at unit time t, $UL_{bits}(t)$ denotes the number of transmitted data bits at unit time t, $\alpha$ denotes a value that leads to a higher bit rate, $T_s$ denotes the duration of the unit time, $V_{BitRate}$ denotes the video encoding bit rate, and $R_{norm}$ denotes a normalized value of extra bytes added to a video stream.

3. A method for setting an output bit rate for video data transmission in a Wireless Broadband (WiBro) system, said method comprising:
   calculating an uplink state value for a predetermined unit time to determine an uplink network state of the predetermined unit time;
   calculating an average of uplink state values for a predetermined number of unit times; and
   increasing a video encoding bit rate if the average of the uplink state values is larger than a predetermined first threshold, and decreasing the video encoding bit rate, if the average of the uplink state values is less than a predetermined second threshold, wherein an average of uplink state values calculation comprises calculating the average of the uplink state values by the following equation, $$AvgUL_{value} = \frac{\sum_{i=0}^{N_{avg}-1} UL_{value}(i \cdot T_s)}{N_{avg}}$$

where $AvgUL_{value}$ denotes the average of the uplink state values and $N_{avg}$ denotes the number of valid uplink state values buffered in the buffer, which are to be averaged.

4. The method of claim 3, wherein $N_{avg}$ is calculated by the following equation, $$N_{avg} = \min\{N_B, N_{VL}\}$$

where $N_B$ denotes a buffer size, and $N_{VL}$ denotes the number of uplink state values that are calculated under a particular video bit rate.

5. A method for setting an output bit rate for video data transmission in a Wireless Broadband (WiBro) system, said method comprising:
   calculating an uplink state value for a predetermined unit time to determine an uplink network state of the predetermined unit time;
   calculating an average of uplink state values for a predetermined number of unit times; and
   increasing a video encoding bit rate if the average of the uplink state values is larger than a predetermined first threshold, and decreasing the video encoding bit rate, if the average of the uplink state values is less than a predetermined second threshold,
   wherein the first threshold is calculated by the following equation, $$Th_{up} = 1 + \frac{1}{N_{avg}}$$

where $Th_{up}$ comprises the first threshold, and the second threshold is calculated by the following equation, $$Th_{down} = 1 - \frac{1}{N_{avg}}$$

where $Th_{down}$ is the second threshold.

6. A method for setting an output bit rate for video data transmission in a Wireless Broadband (WiBro) system, said method comprising:
    calculating an uplink state value for a predetermined unit time to determine an uplink network state of the predetermined unit time;
    calculating an average of uplink state values for a predetermined number of unit times; and
    increasing a video encoding bit rate if the average of the uplink state values is larger than a predetermined first threshold, and decreasing the video encoding bit rate, if the average of the uplink state values is less than a predetermined second threshold,
    wherein increasing and decreasing the video encoding bit rate comprises setting a particular video encoding bit rate by the following equation, $$V_{BitRate} = \begin{bmatrix} \min\left\{256k, \left(\frac{V_{BitRate}}{64k} + 1\right) \cdot 64k\right\}; AvgUL_{value} > Th_{up} \\ \max\left\{64k, \left(\frac{V_{BitRate}}{64k} - 1\right) \cdot 64k\right\}; AvgUL_{value} < Th_{down} \end{bmatrix}$$

where $V_{BitRate}$ denotes the video encoding bit rate, $AvgUL_{value}$ denotes the average of the uplink state values, $Th_{up}$ comprises the first threshold, $Th_{down}$ is the second threshold.

7. The method of claim 1, further comprising clearing all uplink state values stored in a buffer, when the video encoding bit rate is changed.

8. The method of claim 1, wherein a value of average of uplink state values is about 1.

* * * * *